US010921781B2

(12) United States Patent
Nelaturi et al.

(10) Patent No.: US 10,921,781 B2
(45) Date of Patent: Feb. 16, 2021

(54) SYSTEM AND METHOD FOR PLANNING SUPPORT REMOVAL IN HYBRID MANUFACTURING WITH THE AID OF A DIGITAL COMPUTER

(71) Applicant: Palo Alto Research Center Incorporated, Palo Alto, CA (US)

(72) Inventors: Saigopal Nelaturi, Mountain View, CA (US); Morad Behandish, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 54 days.

(21) Appl. No.: 16/517,450

(22) Filed: Jul. 19, 2019

(65) Prior Publication Data

US 2019/0351621 A1 Nov. 21, 2019

Related U.S. Application Data

(63) Continuation of application No. 15/858,520, filed on Dec. 29, 2017, now Pat. No. 10,359,764.

(51) Int. Cl.
*G05B 19/4099* (2006.01)
*B29C 64/393* (2017.01)
(Continued)

(52) U.S. Cl.
CPC ........ *G05B 19/4099* (2013.01); *B29C 64/393* (2017.08); *B29C 64/40* (2017.08);
(Continued)

(58) Field of Classification Search
CPC .... G05B 19/4099; B33Y 50/02; B29C 64/393
See application file for complete search history.

(56) References Cited

U.S. PATENT DOCUMENTS 9,524,357 B1 12/2016 Webster
9,844,917 B2 12/2017 Burhop et al.
(Continued)

OTHER PUBLICATIONS

EP Patent Application No. 18212126.9; European Search Report dated Jun. 19, 2019; 15 pages.
(Continued)

*Primary Examiner* — Ronald D Hartman, Jr.
(74) *Attorney, Agent, or Firm* — Mueting Raasch Group

(57) ABSTRACT

Algorithmic reasoning about a cutting tool assembly's space of feasible configurations can be effectively harnessed to construct a sequence of motions that guarantees a collision-free path for the tool assembly to remove each support structure in the sequence. A greedy algorithm models the motion of the cutting tool assembly through the free-spaces around the intermediate shapes of the part as the free-spaces iteratively reduce in size to the near-net shape to determine feasible points of contact for the cutting tool assembly. Each support beam is evaluated for a contact feature along the boundary of the near-net shape that constitutes a feasible point of contact. If a support beam has at least one feasible configuration at each point, the support beam is deemed 'accessible' and a collection of tool assembly configurations that are guaranteed to be non-colliding but which can access all points of contact of each accessible support beam can be generated.

20 Claims, 5 Drawing Sheets

(51) Int. Cl.
  *B33Y 50/02* (2015.01)
  *B29C 64/40* (2017.01)
  *B33Y 50/00* (2015.01)
(52) U.S. Cl.
  CPC .............. *B33Y 50/00* (2014.12); *B33Y 50/02* (2014.12); *G05B 2219/35012* (2013.01); *G05B 2219/35134* (2013.01); *G05B 2219/35204* (2013.01); *G05B 2219/40519* (2013.01); *G05B 2219/42155* (2013.01); *G05B 2219/49007* (2013.01); *G05B 2219/49012* (2013.01); *G05B 2219/49038* (2013.01); *G05B 2219/49041* (2013.01)

(56) References Cited

U.S. PATENT DOCUMENTS

| | | | |
|---|---|---|---|
| 10,635,088 B1* | 4/2020 | Bandara | G05B 19/4099 |
| 2006/0158456 A1 | 7/2006 | Zinniel et al. | |
| 2010/0228369 A1 | 9/2010 | Eggers et al. | |
| 2014/0163720 A1 | 6/2014 | Nelaturi et al. | |
| 2014/0300017 A1 | 10/2014 | Wrighton et al. | |
| 2015/0018995 A1 | 1/2015 | Weitzel et al. | |
| 2015/0066178 A1 | 3/2015 | Stave | |
| 2015/0077417 A1 | 3/2015 | Kara et al. | |
| 2016/0085882 A1 | 3/2016 | Li et al. | |
| 2016/0107396 A1* | 4/2016 | Berman | B25J 11/00 29/428 |
| 2016/0200051 A1 | 7/2016 | Urbanic | |
| 2017/0205806 A1 | 7/2017 | Chaphalkar et al. | |
| 2017/0249440 A1* | 8/2017 | Lang | G16H 50/50 |
| 2018/0162060 A1 | 6/2018 | Mark | |
| 2018/0304361 A1 | 10/2018 | Gibson et al. | |
| 2018/0314235 A1* | 11/2018 | Mirabella | G06F 30/23 |
| 2019/0061269 A1 | 2/2019 | Messner | |
| 2019/0130642 A1 | 5/2019 | Behandish et al. | |
| 2019/0204807 A1 | 7/2019 | Nelaturi et al. | |
| 2019/0204813 A1 | 7/2019 | Behandish et al. | |
| 2019/0270248 A1* | 9/2019 | Hutchinson | B24B 49/003 |
| 2019/0275745 A1* | 9/2019 | Hutchinson | B29C 64/393 |
| 2020/0125068 A1* | 4/2020 | Trounson, III | G05B 19/40938 |
| 2020/0265122 A1* | 8/2020 | Razzell | G06F 30/20 |

OTHER PUBLICATIONS

Behandish et al., "Automated Process Planning for Hybrid Manufacturing", May 18, 2018, 15 pages.

Nelaturi et al., "Automatic Spatial Planning for Machining Operations", 2015 IEEE International Conference on Automation Science and Engineering, Aug. 24-28, 2015, 6 pages.

Shapiro, "Maintenance of Geometric Representations Through Space Decompositions", International Journal of Computational Geometry & Applications, vik. 7; No. 1-2, Apr. 1, 1997, 31 pages.

Zhang et al., "Laser Additive Manufacturing Process Planning and Automation", Proceedings of the 10$^{th}$ Annual Solid Freeform Fabrication Symposium, Jan. 1, 2000, pp. 243-250.

* cited by examiner

SYSTEM AND METHOD FOR PLANNING SUPPORT REMOVAL IN HYBRID MANUFACTURING WITH THE AID OF A DIGITAL COMPUTER

RELATED APPLICATIONS

This application is a continuation of U.S. patent application Ser. No. 15/858,520, filed Dec. 29, 2017, which is incorporated herein by reference in its entirety.

STATEMENT REGARDING FEDERALLY SPONSORED RESEARCH AND DEVELOPMENT

This invention was made with Government support under DARPA HR0011-17-2-0030 [New] Fields: fabricating with interoperable engineering, planning, design, and analysis. The Government has certain rights in this invention.

FIELD

This application relates, in general, to hybrid manufacturing processes and, in particular, to a system and method for planning support removal in hybrid manufacturing with the aid of a digital computer.

BACKGROUND

Historically, the manufacturing of parts from raw stock or material has involved two distinct, albeit combinable, manufacturing processes. Fabricating a part through subtractive manufacturing (SM) involves progressively removing or machining material from raw stock until the part has been reduced to a rough form within a specified tolerance. In SM processes, raw material is often removed by turning, drilling, or milling the part being fabricated. Drilling involves traversing a rotating bit along a longitudinal axis while milling operates in three-dimensional space. Following completion of SM processes, post-processing may be required to smooth, polish, finish, or otherwise transform the part into final completed form.

Fabricating a part through additive manufacturing (AM) involves progressively adding or depositing material onto a part being fabricated, often by adding successive layers, until the part approximates an intended shape and size. However, in contrast to SM, many AM processes add support materials or scaffolding to the part being fabricated as part of the AM process plan, so that the part does not collapse under its own weight because the part being fabricated will continually increase in size and weight as manufacturing progresses.

While SM processes often end when a rough form of the desired part has been achieved, AM processes may instead create a shape that still requires further transformation due to the addition of the scaffolding. This interim result is known as a near-net shape, which is the part being fabricated, plus any supports that were added during AM manufacturing. Ordinarily, the near-net shape is post-processed to remove the scaffolding using a range of potential processes from manually removing the supports with a chisel-like cutting tool to programming collision-free tool paths for a CNC-mill to remove the supports, after which even further post-processing may be required to transform the part without scaffolding into final form.

Due to the need to remove scaffolding, AM can be characterized as one of several manufacturing processes that may be needed to fabricate a part, rather than as a stand-alone solution, although removing scaffolding is but one example of a manufacturing process that involves both AM and SM operations. More generally, any sequence of AM and SM processes, independent of the ordering of their respective contributions, can be defined as a hybrid manufacturing process. An approach to process planning for hybrid manufacturing is described in U.S. patent application, entitled "System and Method for Constructing Process Plans for Hybrid Manufacturing with the Aid of a Digital Computer," Ser. No. 15/858,677, filed Dec. 29, 2017, now publication number 2019/0204813, the disclosure of which is incorporated by reference.

In a hybrid manufacturing process, understanding the interactions between SM and AM operations is critical, especially when planning the layout and removal of the supporting material generated by the AM process. The interaction of SM and AM processes creates a spatial planning problem that requires the analysis of the feasible, that is, non-colliding, spatial configurations of tools to be used against a dynamic near-net shape that must be continually updated whenever a support is removed. The analysis also requires determining whether supports are being placed in locations during AM that will later be inaccessible to the cutting tools used in the SM process.

Hybrid machines equipped with both AM and SM capabilities have emerged, including the Ambit™-Dextrous Manufacturing system, sold by Hybrid Manufacturing Technologies, McKinney, Tex., and the Lasertec 65 3D, sold by DMG Mori Seiki Co., Nakamura-ku, Nagoya, Japan. These machines typically couple a LENS (Laser Engineered Net Shaping) or similar direct energy deposition AM process with a high-axis milling center to enable AM parts fabrication on curved surfaces. However, LENS-type AM processes are not well suited to creating near-net shapes, which limits the range of parts that can be built.

Therefore, a need exists for an approach to planning removal of AM-process-generated supports from a dynamic near-net shape through an SM process.

SUMMARY

Algorithmic reasoning about a cutting tool assembly's space of feasible configurations can be effectively harnessed by an SM tool path planner to construct a sequence of motions that guarantees a collision-free path for the tool assembly to remove each support structure in the sequence. A greedy algorithm models the motion of the cutting tool assembly through the free-spaces around the intermediate shapes of the part as the free-spaces iteratively reduce in size to the near-net shape to determine feasible regions (or points) of contact for the cutting tool assembly. Each support beam is evaluated for a contact feature along the boundary of the near-net shape that constitutes a feasible region of contact for the tool assembly to either partially or totally remove the individual support beam. If non-existent, the part is found to be non-manufacturable because no SM process plan to cut the support beams from the near-net shape, such that the part can be dislodged, exists. However, if a support beam has at least one feasible configuration at each region of contact with the part, the support beam is deemed 'accessible' and a collection of tool assembly configurations that are guaranteed to be non-colliding but which can access all regions of contact of each accessible support beam can be generated. Support beams deemed accessible in one iteration of the algorithm are removed from the next iteration, so that the near-net shape gradually shrinks to the part's shape.

An embodiment provides a system and method for planning support removal in hybrid manufacturing with the aid of a digital computer. A computer is provided with parameters for a machining tool assembly. Each parameter includes orientations and positions of the machining tool assembly. The computer is also provided with a model of a part defining surfaces and the interior of the part and one or more support structures that were added to the part during additive manufacturing. A near-net shape is modeled with the computer initially as the part combined with the support structures. A configuration space is set up with the computer including geometric transformations that represent the spatial motions of the machining tool assembly based upon the machining tool assembly's parameters. A manner of construction of each of the support structures is determined with the computer to provide contact features at an intersection of the support structures and the part. Each of the support structures is evaluated with the computer for the existence of a contact feature within free-space that is available within the configuration space around the near-net shape that includes a feasible region of contact for the tool assembly to remove all of the support structures that are accessible from the near-net shape. A collision-free support removal sequence is guaranteed to exist for every support structure in the set of accessible support structures. in further embodiments, various heuristics can be used to order the sequence of support removals, for instance, minimizing orientation changes, minimizing time or cost, maximizing surface quality, and so forth.

While planning the support removal sequence, each newly removed support structure is added to a list representing the removal sequence and the near-net shape is continually updated as each support structure is incrementally removed. For each of the support structures in the support removal sequence, a set of collision-free contact configurations of the machining tool assembly at the boundary feature is constructed with the computer, provided that boundary features are found for all of the support structures. Note that as each support is removed, the tool's feasible configuration space increases and increases the available space of motions for the next accessible support. Process plans including machining operations by the machining tool assembly are created with the computer based upon the sets of collision-free contact configurations of the machining tool assembly for the support structures. The machining tool assembly is programmed with the computer with the process plans and the machining tool assembly is operated per the machining operations in the process plans by machining off the support structures.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Planning SM processes for removing scaffolding from an AM-produced near-net shape requires analysis of feasible non-colliding cutting tool configurations in a dynamically-changing space. As each support is removed from the near-net shape, the space available to the cutting tool for collision-free motion around the near-net shape changes, usually by increasing the amount of free space within which a cutting tool assembly can move. For each type of cutting tool to be used, a tool's configuration includes a position and orientation. Thus, the combination of the part and scaffolding, which constitute the near-net shape, and tool assembly configuration geometries together creates a complex problem space for determining support removability through SM processes.

Figure 1:
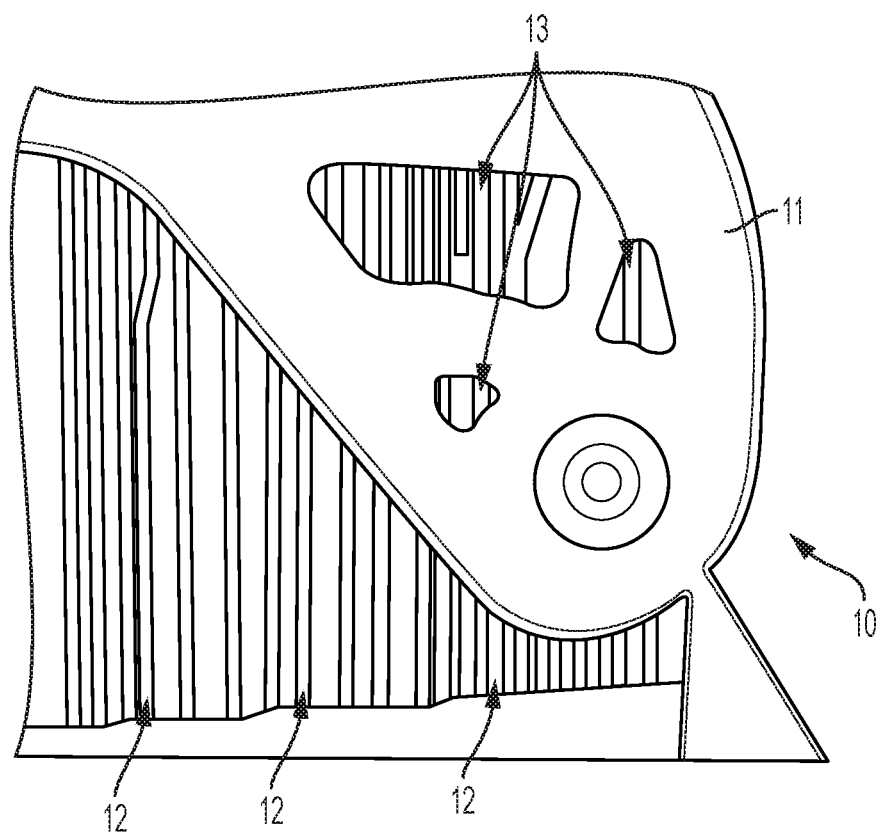
FIG. 1 is a side view showing, by way of example, a near-net shape as fabricated through AM processes.

A support removal process plan for SM processes includes sequences of support beams to be removed. FIG. 1 is a side view showing, by way of example, a near-net shape 10 as fabricated through AM processes. Support structures or scaffolding, often in the form of support beams 12, have been added during AM to support the part being fabricated 11. The scaffolding is often organized in tree-like shapes to save material, which is eventually discarded or potentially reused for other purposes. For convenience, "support structure," "scaffolding," and "support beam" will be used interchangeably to refer to the support material that has been added to a part being fabricated by AM processes.

Figure 2:
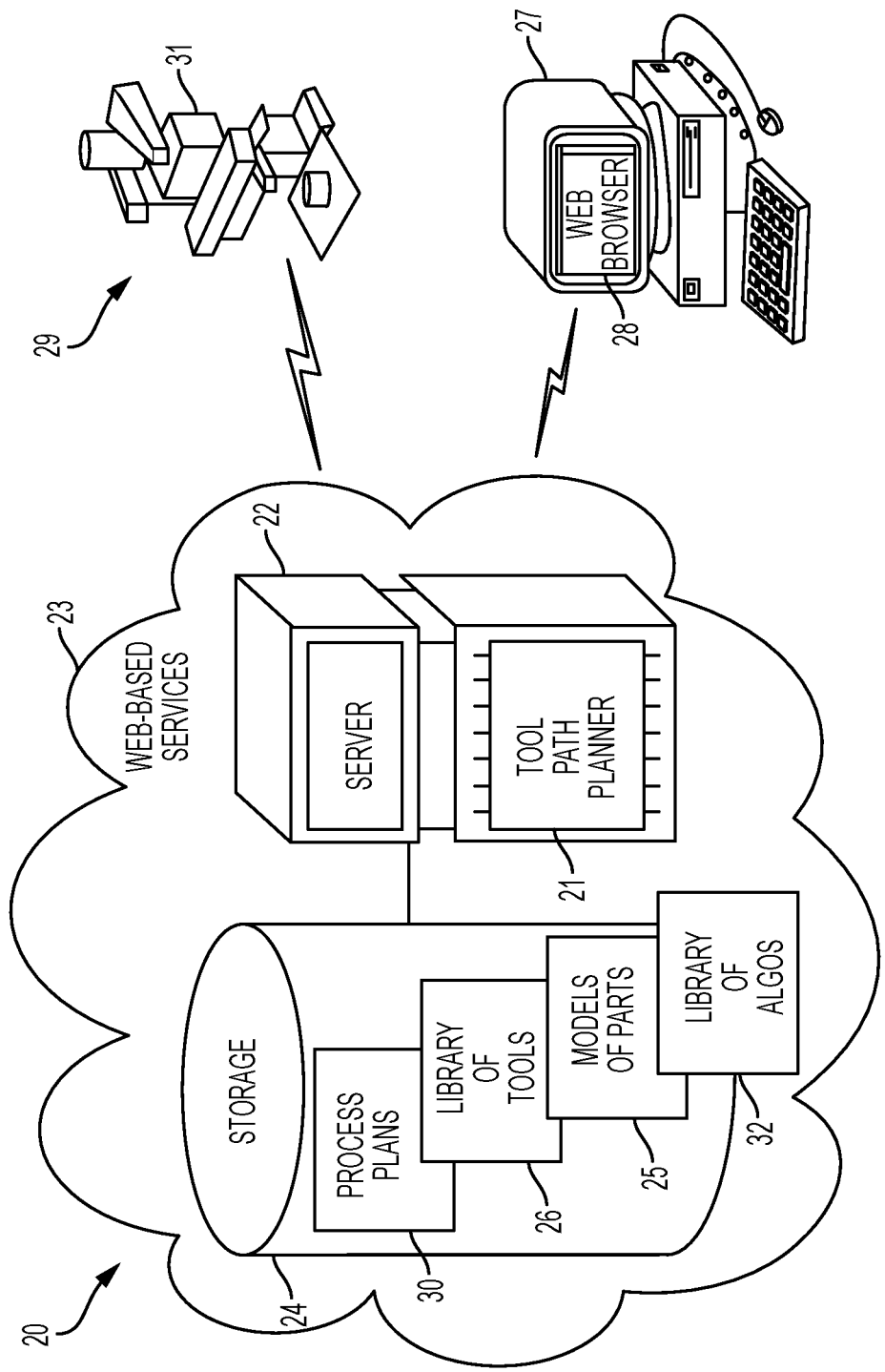
FIG. 2 is a functional block diagram showing a system for planning support removal in hybrid manufacturing with the aid of a digital computer in accordance with one embodiment.

For each support removal sequence generated, a tool path planner, such as a computer-aided manufacturing (CAM) system, or a system using motion planning algorithms, for instance, the Open Motion Planning Library (OMPL), generates a tool path to be used in a process plan. FIG. 2 is a functional block diagram showing a system 20 for planning support removal in hybrid manufacturing with the aid of a digital computer in accordance with one embodiment. A tool path planner 21 is provided through a centralized server 22. The server 22 can be remotely accessed via the Web over a wide area public data communications network, such as the Internet, using wired or wireless connections. Users can interface with the server 22 through a Web browser 28 executing on a personal computer 27, mobile "smart" phone, or similar device. Alternatively, the tool path planner 21 can be provided locally on the personal computer 27 or similar device.

The server 22 is operatively coupled to a storage device 24, within which is stored models of designed parts 25 that define surfaces and the interior of the part, such as represented using some CAD representation such as STEP, STL, voxels or some other solid model representation, a library of cutting or machining tools 26, and, in one embodiment, a library of motion planning algorithms, such as the Open Motion Planning Library (OMPL). Both the server 22 and personal computer 27 include components conventionally found in general purpose programmable computing devices, such as a central processing unit, memory, input/output ports, network interfaces, and non-volatile storage, although other components are possible. In addition, other computational components are possible.

In one embodiment, through the tool path planner 21, the Web-based service 23 generates process plans 30 that each contain support removal sequences. Each sequence includes CNC machining instructions that have been generated by the tool path planner 21 by modeling the inherent capabilities of a hybrid manufacturing setup 29. The hybrid manufacturing setup 29 includes a cutting or machining tool assembly 31 for performing SM operations. The machining tool assembly 29 can be programmed with the machining instructions in the process plans 30 generated by the tool path planner 21 and operated to remove supporting beams 12 from the near-net shape 10.

The tool path planner 21 implements a geometric engine that executes a set of spatial planning algorithms for automated manufacturability analysis of arbitrary geometric models, without making assumptions on the tool geometry and degrees of freedom, or the existence of surrounding tooling and fixtures, such as described in U.S. Pat. No. 9,292,626, issued Mar. 22, 2016, to Nelaturi et al., the disclosure of which is incorporated by reference. The manufacturing setup model corresponds to the library of cutting or machining tools 26 with specifications for each operable tool, and the tool path planner 21 connects the available capability of each tool to the uploaded geometric model of each part 25 to provide qualitatively distinct process plans, represented in the form of a JSON ("JavaScript Object Notation") file or similar structured encoding or human-readable format, with detailed feedback for each individual plan.

Figure 3:
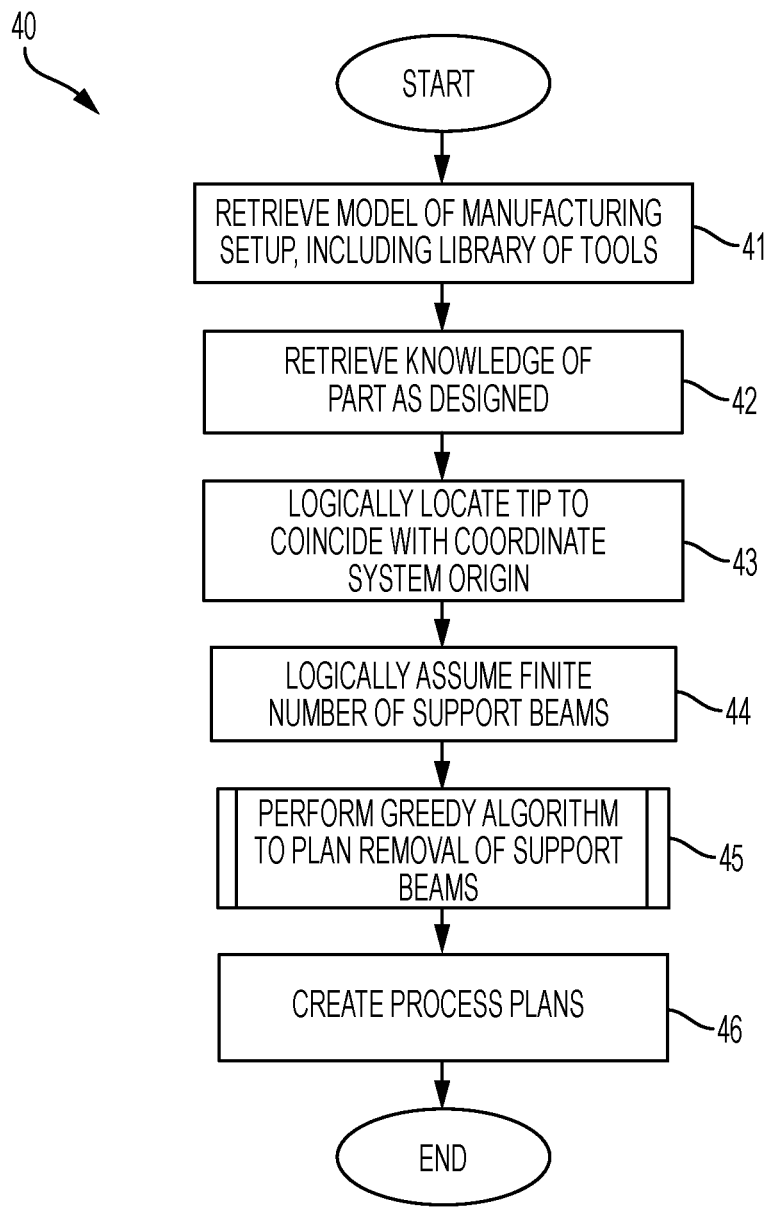
FIG. 3 is a flow diagram showing a method for planning support removal in hybrid manufacturing with the aid of a digital computer in accordance with one embodiment.

The geometric reasoning algorithms use tooling information from the library 26 to allow the tool path planner 21 to generate a collision-free path for the tool assembly to remove one support beam 12 at a time, as further described infra with reference to FIG. 3. As each support beam 12 is removed, the tool path planner 21 must reason about accessing the removal of the remaining support beams 12 in the context of the space just freed up by the removal of that support beam 12. In each successive iteration within the support removal sequence, the tool path planner 21 relies upon a solid model corresponding to the near-net shape 10 and all remaining support structure 12 that together constitute a physical obstacle that the machining tool assembly 31 must avoid. Thus, based upon the available space, the tool path planner 21 attempts to find the best way to remove the next support beam 12 in the support removal sequence, provided that the next support beam 12 is accessible to the machining tool assembly 31.

In modeling an SM process plan problem space, begin by assuming that there are finitely many (say k) support beams 12 that contact the fabricated part 11. Each support beam 12 can be numbered and indexed, so as to generate all k! permutations of support structure removal sequences. Considering that a single part 11 being fabricated may consist of several hundred support beams 12, an enumeration of all k! permutations would result in an astronomically large set of possible support removal sequences. Generating and testing each possible sequence would be impracticable.

On the other hand, human engineers may be able to visually inspect a near-net shape and recommend a candidate set of support beam removal sequences based on their own experience. Importantly, a human engineer may be able to quickly decide if a near-net shape 10 has support beams 12 that cannot be removed, for example, when supports support beams 12 are placed in internal voids 13, and that knowledge can be used to pare down the size of the problem space. Nevertheless, relying upon human expertise can present shortcomings due to the limitations inherent in the human reasoning of three-dimensional space and a fully automated process plan generate and test approach for candidate sequences of support removal is needed.

Algorithmic reasoning about a cutting tool assembly's space of feasible configurations can be effectively harnessed by the tool path planner to construct a sequence of supports structures 12 that guarantees a collision-free path for the tool assembly to remove each support structure 12 in the sequence. FIG. 3 is a flow diagram showing a method 40 for planning support removal in hybrid manufacturing with the aid of a digital computer in accordance with one embodiment. The method 40 is performed as a series of process or method steps performed by, for instance, a general purpose programmed computer, such as the server 22 and personal computer 27, or other programmable computing device.

Initially, a model of the manufacturing setup, including a library of the cutting tools 26 to be used to machine the near-net shape 12, as well as knowledge of the part 11 as designed and the scaffolding 12 (available through the stored models of designed parts 25), are respectively retrieved (steps 41 and 42). Note that initially, the near-net shape 10 is the combination of the part 11 and the scaffolding 12. The library 26 stores information on each type of milling tool, including the orientations and positions in which the milling tool can operate. Next, for process planning purposes, the tip of the machining tool assembly 29 is logically located (step 43) to coincide with the origin of a coordinate system in $R^3$. The tool assembly's tip would ordinarily be the aspect of the machining tool 31 that makes actual physical contact with the near-net shape 10 to remove a support beam 12 from the part 11. This coordinate system is used to measure the relative positions and orientations of the tool assembly T with respect to the near-net shape N. Next, logically assume that there are finitely many support beams $S=\{S_1, \ldots, S_k\}$ added on to the part P that is intended to be fabricated by the AM process (step 44). In general, k will represent the actual number of support beams 12. Therefore, $N = P \cup_{i=1}^{k} S_i$.

Unlike traditional machining, the entire scaffolding 12 need not be completely machined off the near-net shape 10, though that is a feasible strategy. Rather, in SM processes, fracturing the region (or point) of contact between the support beam 12 and the part 11, so that the part 11 can be disengaged from the support beam 12, will suffice. Therefore, at a minimum, collision-free contacts between the cutting tool's tip and the region of a near-net shape 10 where a support beam 12 touches the part's surface must be found. A greedy algorithm to plan the removal of the support beams 12 from the near-net shape 10 is performed (step 45), as further described infra with reference to FIG. 4 (step 46), after which process plans are created (step 47) based upon the collection of tool assembly configurations that were generated and the method completes.

Figure 4:
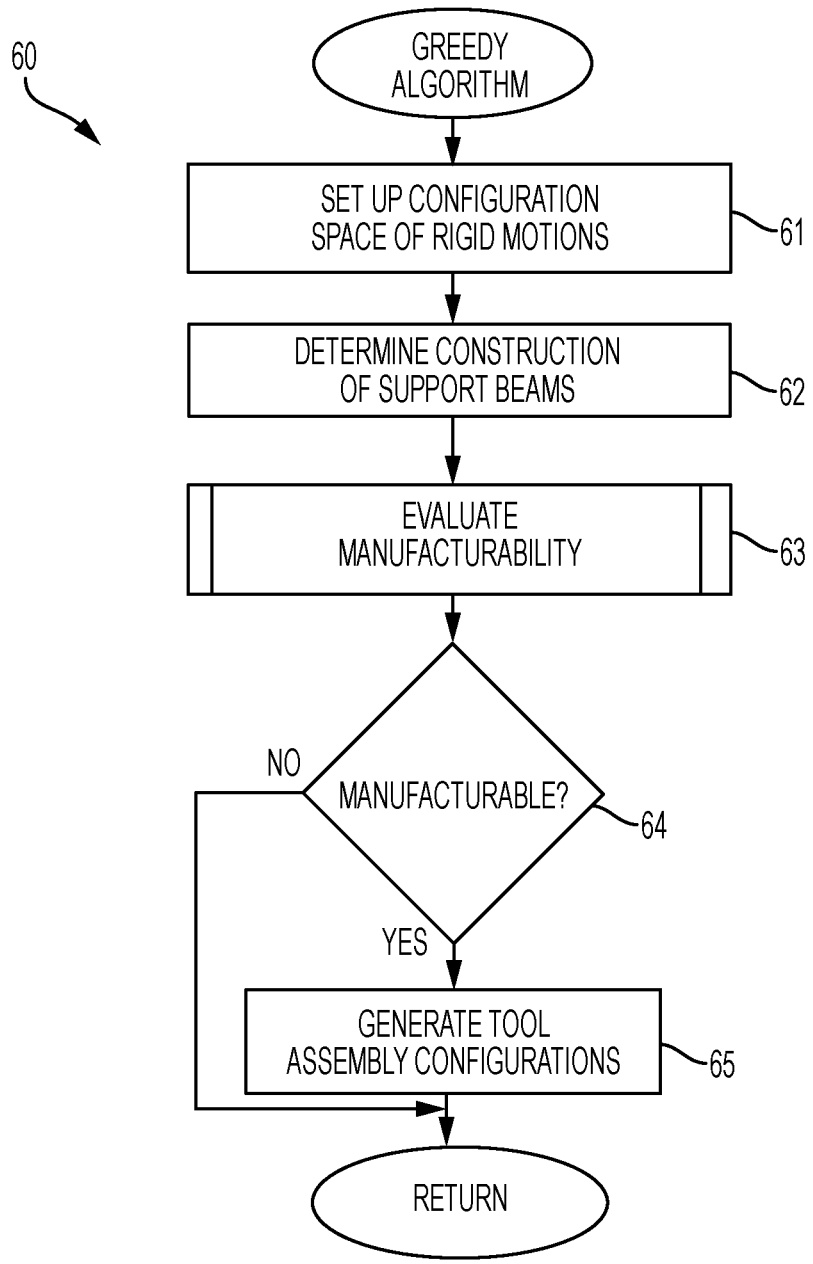
FIG. 4 is a flow diagram showing a routine for performing a greedy algorithm to plan the removal of the support beams from the near-net shape for use in the method of FIG. 3.

The greedy algorithm models the motion of the tool assembly 31 through the free-spaces around the near-net shape 10 and the part 10 to determine feasible points of contact for the tool assembly 31. FIG. 4 is a flow diagram showing a routine 60 for performing a greedy algorithm to plan the removal of the support beams 12 from the near-net shape 10 for use in the method 40 of FIG. 3. First, a configuration space of rigid motions for the tool assembly 31 (geometric transformations) is set up (step 61) by assuming that the tool assembly T can operate with all six degrees of freedom available for a rigid body, that is, three translations and three rotations. Mathematically, this assumption can be expressed as the configuration space of rigid motions $C=R^3 \times SO(3)$, where $SO(3)$ refers to the group of $3\times3$ orthogonal transformations that represent spatial rotations of the tool assembly T based upon the tool assembly's parameters, including orientations and positions along which the tool cuts away raw material. Define projections from C to $R^3$ and to $SO(3)$ as follows:

$$\pi_1: C \rightarrow R^3 \quad (1)$$

$$\pi_2: C \rightarrow SO(3) \quad (2)$$

Now, define the free-space $\mathcal{F}_N$ around the near-net shape N as the set of all of tool assembly T's configurations that do not collide with the near-net shape N, that is, all non-colliding orthogonal transformations of the machining tool assembly within the configuration space C, and any work-holding devices W that are used to fixture the part as scaffolding is removed:

$$\mathcal{F}_N = \{g \in C \text{ s.t. } T_g \cap *\{N \cup W\} = \emptyset\} \quad (3)$$

where the letter g emphasizing that C is also a Lie group called the Special Euclidean group SE(3). Here $T_g$ refers to the tool assembly T transformed by an element $g \in C$, and $\cap *$ refers to regularized intersection. The complement of the free space $\mathcal{F}_N$ is called the obstacle space O that delineates configurations of the tool assembly T that cause collision with the near-net shape N. Therefore, the boundary shared by O and $\mathcal{F}_N$ delineates all of the tool configurations that cause contact, but no collision between the tool assembly T and the near-net shape N.

Similarly, define the free-space $\mathcal{F}_P$ around the part P as the set of all of tool assembly T's configurations that do not collide with $P \cup W$, which is the part P and any workholding devices W.

$$\mathcal{F}_P = \{g \in C \text{ s.t. } T_g \cap *\{P \cup W\} = \emptyset\} \quad (4)$$

Notice that after the AM processes complete and before the SM processes start, $\mathcal{F}_P \supset \mathcal{F}_N$, that is, the free-space $\mathcal{F}_P$ around the part P is a superset of the free-space $\mathcal{F}_N$ around the near-net shape N because the support beams 12 will prevent the tool assembly T from being able to reach the physical space otherwise available to access the part P. As the support beams 12 are removed, the near-net shape N will get smaller and converge in size towards the size of the part P, while the free-space $\mathcal{F}_N$ around the near-net shape N will get larger and converge towards the free-space $\mathcal{F}_P$ around the part P.

Given a boundary feature $F \subset \partial P$, where boundary of a set Y is denoted $\partial Y$, two sets of collision-free contact configurations of tool assembly T at the boundary feature F can be defined as:

$$\mathcal{A}_F^P = \{g \in \partial F_P | \pi_1(T_g) \in F\} \quad (5)$$

$$\mathcal{A}_F^N = \{g \in \partial F_P | \pi_1(T_g) \in F\} \quad (6)$$

The intersection of each support beam $S_i \in S$ with the part P will be a boundary feature $F_i$. For simplicity, assume that boundary feature $F_i$ is a point set, which is consistent with AM practice, where support beams S are often designed to have minimal contact with the boundary of the part $\partial P$ to minimize surface roughness and enable easier fracture and removal of the support beams S by SM processes.

Next, the manner of construction of the support beams 12 is determined (step 62) to provide boundary features at the intersection of the individual support beam $S_i$ and the part P. Preferably, support beams are constructed from a surface of $\partial P$ to a stationary base plate or fixture. However, in some situations, the support beams 12 may have to be constructed from one location of $\partial P$ to another location of $\partial P$. Also, an individual support beam $S_i$ may contact the part P at multiple locations when the contacting support beams are "branched" outwards from a main "trunk," such as occurs when the scaffolding is organized in tree-like shapes. To accommodate these situations, a specific boundary feature $F_i = S_i \cap P$ can be a discrete point set, which is the intersection of the individual support beam $S_i$ and the part P. Therefore, if $\mathcal{A}_{F_i}^N \neq \emptyset$, where $\mathcal{A}_{F_i}^N$ is the set of collision-free contact configurations of tool assembly T at the boundary feature $F_i$, then each $f \in F_i$, such that $\pi_1(\mathcal{A}_{F_i}^N) = f$, is a feasible point of contact for the tool assembly T within the configuration space C to either partially or totally remove the individual support beam $S_i$.

Figure 5:
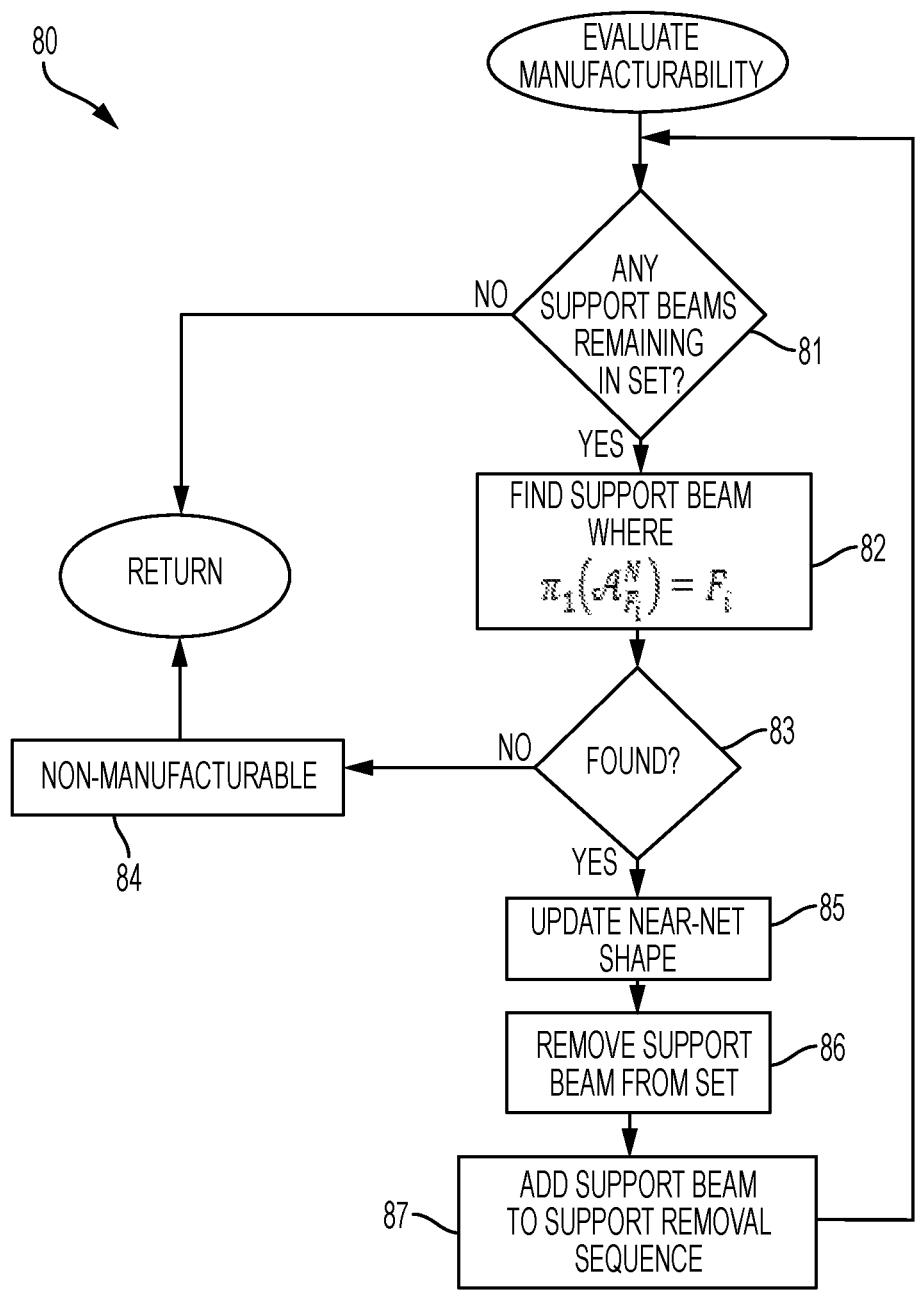
FIG. 5 is a flow diagram showing a recursive routine for evaluating manufacturability of a part being fabricated for use in the routine of FIG. 4.

The part 11 is then evaluated for manufacturability (step 63), as further described infra with reference to FIG. 5. If a part being fabricated 11 is non-manufacturable (step 64), no SM process plan to cut the support beams S from the near-net shape N so that the part P can be dislodged, exists and the greedy algorithm terminates.

On the other hand, if a part being fabricated 11 is manufacturable (step 64), that is, boundary features $F_i$ have been found for all of the support beams S, a collection of tool assembly configurations that are guaranteed to be non-colliding but which can access all points in the boundary features $F_i$ can be generated (step 65) using the support removal sequence, after which the greedy algorithm terminates. In a further embodiment, human engineers can validate the process plans and, if desired, re-order the support removal sequence. The reordered support removal sequence is resubmitted to the greedy algorithm to attempt to re-plan the tool motions to remove the supports without collision, starting with determining the manner of construction of the support beams 12 (step 62) based upon the reordered support removal sequence.

Hybrid manufacturability hinges upon the ability to remove the support beams 12 from a near-net shape 10 to yield the part 11. FIG. 5 is a flow diagram showing a recursive routine 80 for evaluating manufacturability of a part being fabricated 11 for use in the routine 60 of FIG. 4. The routine is recursive, although an iterative structure could be used instead. Assuming that there are still support beams $S_i$ remaining in the set of support beams S (step 81), all of those support beams $S_i$ are evaluated to find an individual support beam $S_i$ where $\pi_1(\mathcal{A}_{F_i}^N) = F_i$ (step 82), that is, $F_i$ is a feature along the boundary of the near-net shape 10 that constitutes a feasible point of contact for the tool assembly T to either partially or totally remove the individual support beam $S_i$. If an individual support beam $S_i$ does not exist (step 83), the part P is found to be non-manufacturable (step 84) because no SM process plan to cut the support beams S from the near-net shape N, so that the part P can be dislodged exists. However, if such an individual support beam $S_i$ does exist (step 83), then by constructing $\mathcal{A}_{F_i}^N$, which is the set of collision-free contact configurations of tool assembly T at the boundary feature $F_i$, a collection of tool assembly configurations that are guaranteed to be non-colliding but which can access all points in $F_i$ can be extracted. The near-net shape 10 is continually updated as each support beam $S_i$ is incrementally removed. Thus, the near-net shape N is updated to become $N - S_i$ (step 85), the individual support beam $S_i$ is removed from the set of remaining support beams S (step 86), and individual support beam $S_i$ is added to the support removal sequence (step 87). The routine recurses (or iterates) until no support beams S remain in the set (step 81), or the part P is found to be non-manufacturable (step 84) for a given sequence of support beams to be removed.

There may be multiple individual support beams $S_i$ that are eligible for removal at each recursion (or iteration), that is, multiple support beams $S_i$ may satisfy the condition that $\pi_1(\mathcal{A}_{F_i}^N)=F_i$ (step 82). The choice of a particular individual support beam $S_i$ then affects how the near-net shape N is updated, which in turn affects the subsequent collision-free contact configurations $\mathcal{A}_F^N$ of tool assembly T at the boundary feature F. A tool path planner 21 that uses motion planning algorithms, for instance, the OMPL, cited supra, may be used to choose a particular support beam 12 and plan the individual tool assembly trajectories from the chosen support beam 12 to the next support beam 12 in the support removal sequence. The challenge with this approach, though, is computing the collision-free contact configurations $\mathcal{A}_{F_i}^N$ of tool assembly T at the boundary feature $F_i$ at each iteration of the support removal sequence, as the near-net shape N is updated as each support beam 12 is removed, which occurs in the six-dimensional configuration space C, as discussed in detail infra. Furthermore, limited accessibility may require complex tool paths to execute (if possible). Nevertheless, the greedy algorithm will always return a valid sequence of support removals if such a sequence exists.

In practical situations, several collision-free support removal sequences may be possible and various combinations of collision-free contact configurations $\mathcal{A}_{F_i}^N$ may need to be explored to find optimal removal sequences. A "good" sequence could be determined by evaluating the candidate process plans based upon a manufacturing heuristic, optimization constraint, or cost constraint sought to be optimized, for instance, minimizing time, using as few orientations as possible for three-axis milling, or maximizing surface finish, such as described in U.S. Patent application Pub. No. US 2017/0220028, filed Jan. 29, 2016, pending, the disclosure of which is incorporated by reference. One or more qualitatively distinct process plans for machining a part through SM processes are created; the surfaces of the part are modeled and parameters for a plurality of cutting tools are obtained. The parameters include orientations and positions along which each cutting tool cuts away raw material. Each process plan includes a maximal set of translations for each cutting tool, where each translation includes a collision-free orientation of the cutting tool and a maximal machinable volume of material removable from the part in that orientation. A search engine navigates through a hierarchically-structured search space that starts at an initial state and transitions to successive states based on actions that satisfy a cost constraint function. One of the actions is chosen as guided by a heuristic that is based on aggregate cost and the negative volume that remains after subtracting the maximal sub-volume for the action chosen. Each state and each action includes a tool, orientation of the tool, and a maximal machinable volume. The search ends when a goal condition is satisfied and the actions that satisfy the cost constraint function constitute the process plan to be used.

More generally, to optimize the sequencing of SM processes, a search space can be iteratively built where each search node stores distinct boundary features $F_N$ for the near-net shape N as obtained by calculating the free-space $\mathcal{F}_N$ around the near-net shape N resulting from subtracting a distinct support beam $S_i \in S$ from the near-net shape N. Several practical heuristics may be used to pick the support beams 12 that are good candidates for removal. For example, visibility analysis for manufacturing algorithms may be used to decide which of the $F_i$ have the most visibility because visibility can be used as a weak condition for accessibility. Furthermore, there may be practical considerations about how much deviation from the surface normal can be allowed for the tool contact orientations to minimize scalloping the part surface. Therefore, a limited set of cutting tool assembly orientations may be chosen a priori to minimize the number of cutting tool assembly orientations for which the free-spaces need to be computed.

The six-dimensional configuration space of obstacles and free-space for complex cutting tool and fixture assemblies can be effectively modeled to compute the collision-free contact configurations $\mathcal{A}_{F_i}^N$ of tool assembly T at the boundary feature $F_i$ at each iteration of a support removal sequence, such as described in S. Nelaturi, *Configuration Modeling*, Ph.D. Dissertation, Univ. of Wisconsin-Madison (2012), and U.S. Pat. No. 9,235,658, issued Jan. 12, 2016, to Nelaturi et al., and U.S. Pat. No. 9,566,697, issued Feb. 14, 2017, to Nelaturi et al., the disclosures of which are incorporated by reference. Given a collection of orientations sampled to a desired density, the six-dimensional spaces can be computed by calculating the three-dimensional translational free-space for each sampled orientation. In practice, computing the obstacle space, that is, the complement of the free-space, may be more convenient to compute since the obstacle space is a closed and bounded set. By computing the six-dimensional obstacle space, all of the contact configurations at a specific location can be retrieved by querying the boundary of the six-dimensional obstacle in time linear to the number of sampled orientations. The collision-free contact configurations $\mathcal{A}_{F_i}^N$ can be obtained by querying the contact configurations at each $F_i$.

More generally, given a collection of free-spaces obtained by iteratively reducing the number of support beams, standard search algorithms, such as A* (with an implemented cost function), can be used to find the best sequence of free-spaces that will provide a low-level tool path planner that uses motion planning algorithms, for instance, the OMPL, cited supra, all the available configurations to find a tool path from one support beam to the next support beam, and execute the support removal.

While the invention has been particularly shown and described as referenced to the embodiments thereof, those skilled in the art will understand that the foregoing and other changes in form and detail may be made therein without departing from the spirit and scope of the invention.

What is claimed is:

1. A system, comprising:
   a storage device that stores parameters of a manufacturing process for removing one or more support structures from a part using a set of tools of a manufacturing assembly; and
   a processor configured to determine whether a support structure is removable based on the parameters of the manufacturing assembly and to develop a process plan comprising manufacturing operations by the manufacturing assembly that remove the support structures.

2. The system of claim 1, further comprising the manufacturing assembly configured to use one or more of the tools to remove the support structures according to the process plan.

3. The system of claim 1, wherein:
   the storage device stores a near-net shape initially modeled as the part combined with the support structures; and
   the near-net shape is continually updated as the processor determines that a support structure is removable.

4. The system of claim 1, wherein each parameter comprises at least one of an orientation and a position of the manufacturing assembly.

5. The system of claim 1, wherein the storage device stores a model of the part defining surfaces of the part, interior of the part, and the support structures.

6. The system of claim 5, wherein the processor is configured to evaluate each support structure to identify contact features at an intersection of the support structure and the part and to add a support structure to a support removal sequence of the process plan if a contact feature accessible by the manufacturing assembly is identified.

7. The system of claim 6, wherein the processor is configured to construct for each support structure in the support removal sequence a set of collision-free contact configurations of the manufacturing assembly at a contact feature of the support structure.

8. The system of claim 6, wherein the processor is configured to determine that a part is non-manufacturable when no accessible contact feature exists.

9. The system of claim 6, wherein the processor is configured to generate a plurality of support removal sequences and to select one of the support removal sequences based upon an optimization constraint.

10. The system of claim 6, wherein the processor is configured to reorder the support removal sequence and re-attempt to create the process plan based upon the reordered support removal sequence.

11. A method comprising:
    storing parameters of a manufacturing process for removing one or more support structures from a part using a set of tools of a manufacturing assembly;
    determining whether a support structure is removable based on the parameters of the manufacturing assembly; and
    developing a process plan comprising manufacturing operations by the manufacturing assembly that remove the support structures.

12. The method of claim 11, further comprising operating the manufacturing assembly to remove the support structures according to the process plan.

13. The method of claim 11, wherein each parameter comprises at least one of an orientation and a position of the manufacturing assembly.

14. The method of claim 11, further comprising storing a model of the part, the model defining surfaces of the part, interior of the part, and the support structures.

15. The method of claim 14, wherein developing the process plan comprises:
    evaluating each support structure to identify contact features at an intersection of the support structure and the part; and
    adding a support structure to a support removal sequence of the process plan if a contact feature accessible by the manufacturing assembly is identified.

16. The method of claim 15, further comprising constructing for each support structure in the support removal sequence a set of collision-free contact configurations of the manufacturing assembly at a contact feature of the support structure.

17. The method of claim 15, further comprising determining that a part is non-manufacturable when no accessible contact feature exists.

18. The method of claim 15, further comprising generating a plurality of support removal sequences and to select one of the support removal sequences based upon an optimization constraint.

19. The method of claim 15, further comprising:
    reordering the support removal sequence; and
    re-attempting to create the process plan based upon the reordered support removal sequence.

20. The method of claim 11, further comprising:
    storing a near-net shape initially modeled as the part combined with the support structures; and
    continually updating the near-net shape based on determining that a support structure is removable.

* * * * *